United States Patent
Bhattacharjee

(10) Patent No.: US 9,351,211 B2
(45) Date of Patent: May 24, 2016

(54) RELEASE WITH REDIRECT TO LTE

(71) Applicant: TELEFONAKTIEBOLAGET L M ERICSSON (PUBL), Stockholm (SE)

(72) Inventor: Shouvik Bhattacharjee, Bellevue, WA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 12 days.

(21) Appl. No.: 14/461,762

(22) Filed: Aug. 18, 2014

(65) Prior Publication Data

US 2016/0050600 A1 Feb. 18, 2016

(51) Int. Cl.
*H04W 36/00* (2009.01)
*H04W 36/14* (2009.01)
*H04W 36/30* (2009.01)
*H04W 76/06* (2009.01)

(52) U.S. Cl.
CPC .............. *H04W 36/14* (2013.01); *H04W 36/30* (2013.01); *H04W 76/06* (2013.01)

(58) Field of Classification Search
CPC ...... H04W 36/14; H04W 36/30; H04W 76/06
USPC ................................................. 455/436–444
See application file for complete search history.

(56) References Cited

U.S. PATENT DOCUMENTS

| | | | | | |
|---|---|---|---|---|---|
| 8,023,467 | B2* | 9/2011 | Wu | ...................... | H04W 76/048 370/331 |
| 8,885,599 | B2* | 11/2014 | Rexhepi | ............ | H04W 36/0022 370/252 |
| 2009/0232097 | A1* | 9/2009 | Taneja | ................... | H04W 36/02 370/331 |
| 2011/0110332 | A1* | 5/2011 | Kim | .................. | H04W 36/0016 370/331 |
| 2013/0017833 | A1* | 1/2013 | Sakamoto | ........... | H04J 11/0053 455/436 |
| 2013/0258883 | A1* | 10/2013 | Vargas Bautista | | H04W 36/0094 370/252 |
| 2014/0016614 | A1* | 1/2014 | Velev | .................... | H04W 4/005 370/331 |
| 2014/0031036 | A1* | 1/2014 | Koo | ...................... | H04W 36/14 455/434 |

\* cited by examiner

*Primary Examiner* — Shahriar Behnamian

(57) ABSTRACT

A Radio Network Controller (RNC) and method in a non-Long Term Evolution (non-LTE) radio access network for controlling a Release with Redirection (RwR) procedure in which a User Equipment (UE) operating in the non-LTE radio access network is released and redirected to an LTE radio access network. When the RNC detects that the UE has been inactive for a defined period of time, and the UE is capable of operating in the LTE radio access network, the RNC determines whether the UE will have adequate signal quality to operate in the LTE radio access network. If so, the RNC performs the RwR procedure to release the UE from the non-LTE radio access network and redirect the UE to the LTE radio access network. If not, the RNC performs a normal release procedure.

15 Claims, 6 Drawing Sheets

RELEASE WITH REDIRECT TO LTE

TECHNICAL FIELD

The present disclosure relates to a method and an apparatus for caching and in particular to a method and an apparatus for enabling caching of a portion of a media file in a User Equipment (UE).

BACKGROUND

Release with Redirect (RwR) to Long Term Evolution (LTE) is a network-controlled inter-Radio Access Technology (IRAT) mobility feature for moving LTE/UMTS-capable User Equipments (UEs) from an access network utilizing Wideband Code Division Multiple Access (WCDMA) to an access network utilizing LTE when the UEs transition to lower activity states. RwR enables "chatty" UEs that have transitioned from LTE to Universal Mobile Telecommunications System (UMTS) due, for example, to a lack of LTE coverage or Circuit Switched FallBack (CSFB), to transition back to LTE more quickly.

RwR also allows active mode mobility for all UEs. It is mandatory for Release-8 (Rel-8) devices to support RwR functionality. It is optional for Rel-8 devices to support packet-switched (PS) Handover.

RwR improves LTE utilization by quickly moving UEs over to LTE after having been served, for different reasons, by UMTS.

SUMMARY

There are a number of problems with the existing RwR procedures. There are situations when the LTE coverage overlay is not same as WCDMA. In this situation, UEs sometimes "ping pong" between LTE and WCDMA. When a UE moves to WCDMA from LTE, it will always try to go back to LTE. When LTE is not available in the UE's location, the UE continues its attempts to go back to LTE. When LTE is available, RwR is performed blindly to LTE without checking the LTE resource. This back and forth transition causes too many location updates, which increases the load on the user's Home Location Register (HLR). Additionally, the back and forth transition may cause users to miss incoming voice calls, and may adversely impact data services. Overall, the user experience is degraded.

In various embodiments, the present disclosure overcomes the current problems by preventing the UE from performing the RwR procedure under defined conditions.

In one embodiment, the disclosure provides a method in a Radio Network Controller (RNC) in a non-Long Term Evolution (non-LTE) radio access network for controlling a Release with Redirection (RwR) procedure in which a User Equipment (UE) operating in the non-LTE radio access network is released and redirected to an LTE radio access network. The method includes detecting that the UE has been inactive for a defined period of time; in response to detecting that the UE has been inactive for the defined period of time and when the UE is capable of operating in the LTE radio access network, determining whether the UE will have adequate signal quality to operate in the LTE radio access network; and performing the RwR procedure to release the UE from the non-LTE radio access network and redirect the UE to the LTE radio access network only upon determining that the UE will have adequate signal quality to operate in the LTE radio access network.

In another embodiment, the disclosure provides an RNC in a non-LTE radio access network for controlling an RwR procedure in which a UE operating in the non-LTE radio access network is released and redirected to an LTE radio access network. The RNC includes a processor coupled to a memory that stores computer program instructions. When the processor executes the computer program instructions, the RNC is caused to detect that the UE has been inactive for a defined period of time; in response to detecting that the UE has been inactive for the defined period of time and when the UE is capable of operating in the LTE radio access network, determine whether the UE will have adequate signal quality to operate in the LTE radio access network; and perform the RwR procedure to release the UE from the non-LTE radio access network and redirect the UE to the LTE radio access network only upon determining that the UE will have adequate signal quality to operate in the LTE radio access network.

In another embodiment, the disclosure provides a system in a non-LTE radio access network for controlling an RwR procedure. The system includes an LTE-capable UE operating in the non-LTE radio access network, and an apparatus in an RNC configured to release and redirect the UE to an LTE radio access network when defined conditions are met. The apparatus includes a timer for detecting that the UE has been inactive for a defined period of time; a comparison unit configured to determine whether the UE will have adequate signal quality to operate in the LTE radio access network, in response to detecting by the timer that the UE has been inactive for the defined period of time; and an RwR control unit configured to perform the RwR procedure to release the UE from the non-LTE radio access network and redirect the UE to the LTE radio access network only upon determining by the comparison unit that the UE will have adequate signal quality to operate in the LTE radio access network.

Advantageously, the present disclosure provides for less ping-ponging between LTE and WCDMA networks, with correspondingly fewer location updates, fewer missed calls, better data service, and an overall improved user experience. From the operator's perspective, they are not adversely affected if they do not have 100% LTE overlay with WCDMA.

Further features and benefits of embodiments of the disclosure will become apparent from the detailed description below.

BRIEF DESCRIPTION OF THE DRAWINGS

In the following section, the invention will be described with reference to exemplary embodiments illustrated in the figures, in which.

DETAILED DESCRIPTION

Figure 1:
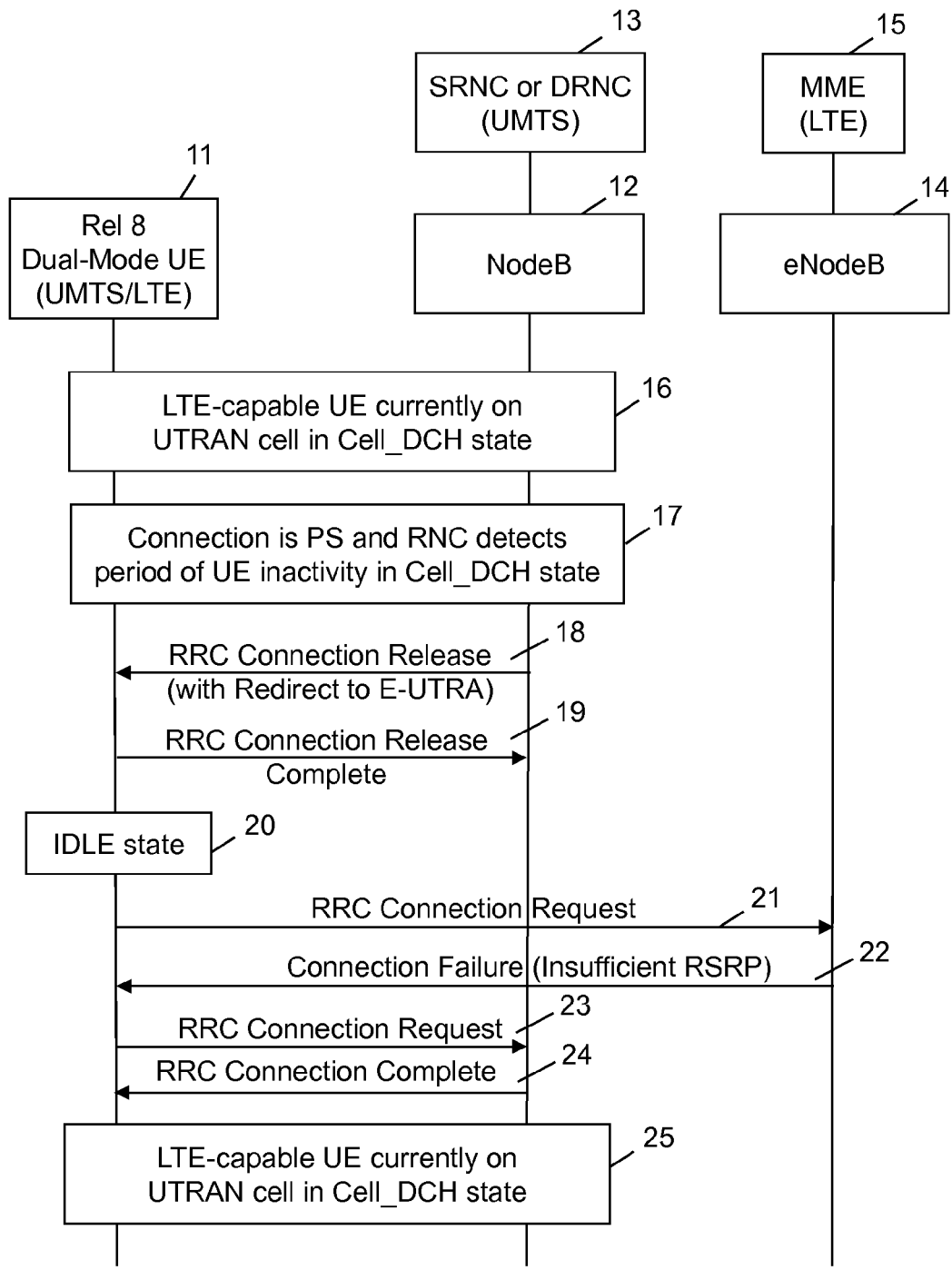
FIG. 1 (Prior Art) is a signaling diagram illustrating the existing RwR procedure.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. Additionally, it should be understood that the invention can be implemented in hardware or a combination of software stored on a non-transitory memory and executed by a general purpose computer or microprocessor.

FIG. 1 is a signaling diagram illustrating the existing RwR procedure. A Release-8 dual-mode (UMTS/LTE) UE 11 is connected through a NodeB 12 to a UMTS Serving Radio Network Controller (SRNC) or Drift RNC (DRNC) 13. An eNodeB 14 is also in the area and connects to an LTE Mobility Management Entity (MME) 15.

At step 16, the LTE-capable UE 11 is currently on a UTRAN cell (served by the NodeB 12) in Cell_DCH state. At step 17, it is noted that the connection is packet-switched (PS) and the RNC detects a period of UE inactivity in Cell_DCH state. Consequently, at step 18 the NodeB sends to the UE, a Radio Resource Control (RRC) Connection Release message 18 with Redirect to E-UTRA. At step 19, the UE sends an RRC Connection Release Complete message to the NodeB, and then enters IDLE state at step 20.

The UE 11 then attempts to go back to LTE by sending an RRC Connection Request message 21 to the eNodeB 14 in the LTE network. When the connection cannot be made, for example due to insufficient Reference Signal Received Power (RSRP), the eNodeB sends a Connection Failure message 22 to the UE. The UE then sends an RRC Connection Request message 23 to the NodeB 12 in an attempt to reconnect to UMTS. If the connection can be made, the NodeB returns an RRC Connection Complete message 24 to the UE. At step 25, the UE is once again on the UTRAN cell in Cell_DCH state.

Figure 2:
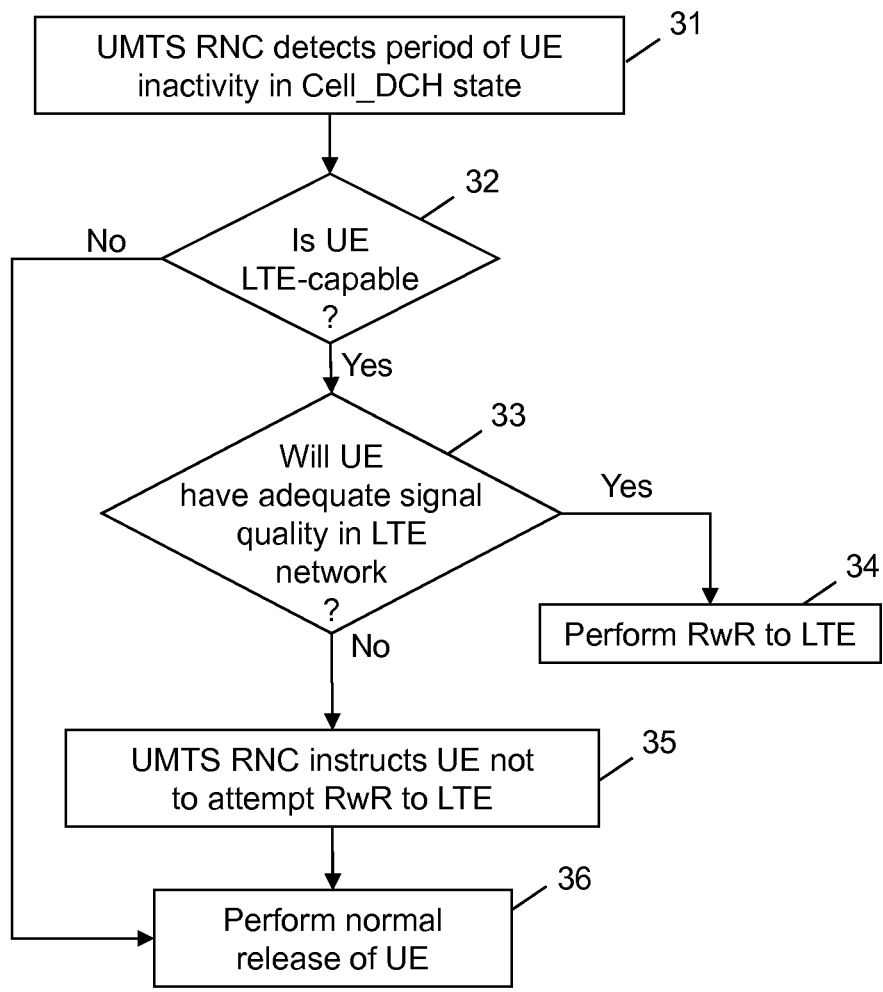
FIG. 2 is a flow chart schematically illustrating an exemplary embodiment of a method for controlling the RwR procedure according to the present disclosure.

FIG. 2 is a flow chart schematically illustrating an exemplary embodiment of a method for controlling the RwR procedure according to the present disclosure. At step 31, the UMTS RNC 13 detects a period of UE inactivity in Cell_DCH state. At step 32, the RNC determines whether the UE is LTE-capable using know techniques. If not, the method jumps to step 36 where the RNC performs a normal release of the UE. However, when the UE is LTE-capable, the method moves to step 33 where the RNC determines whether the UE will have adequate signal quality to connect to the LTE network. As noted in further detail below, this may be done in various ways. For example, the UE may report its RSRP measured from the eNodeB 14, or the RNC may deduce from the location of the UE that it is within the LTE coverage area.

If the RNC determines that the UE will have adequate signal quality to connect to the LTE network, the method moves to step 34 and performs the RwR procedure to redirect the UE to the LTE network. If the RNC determines that the UE will not have adequate signal quality to connect to the LTE network, the method moves to step 35 where the RNC instructs the UE not to attempt RwR to the LTE network. The method then moves to step 36 where the RNC performs a normal release of the UE.

Figure 3:
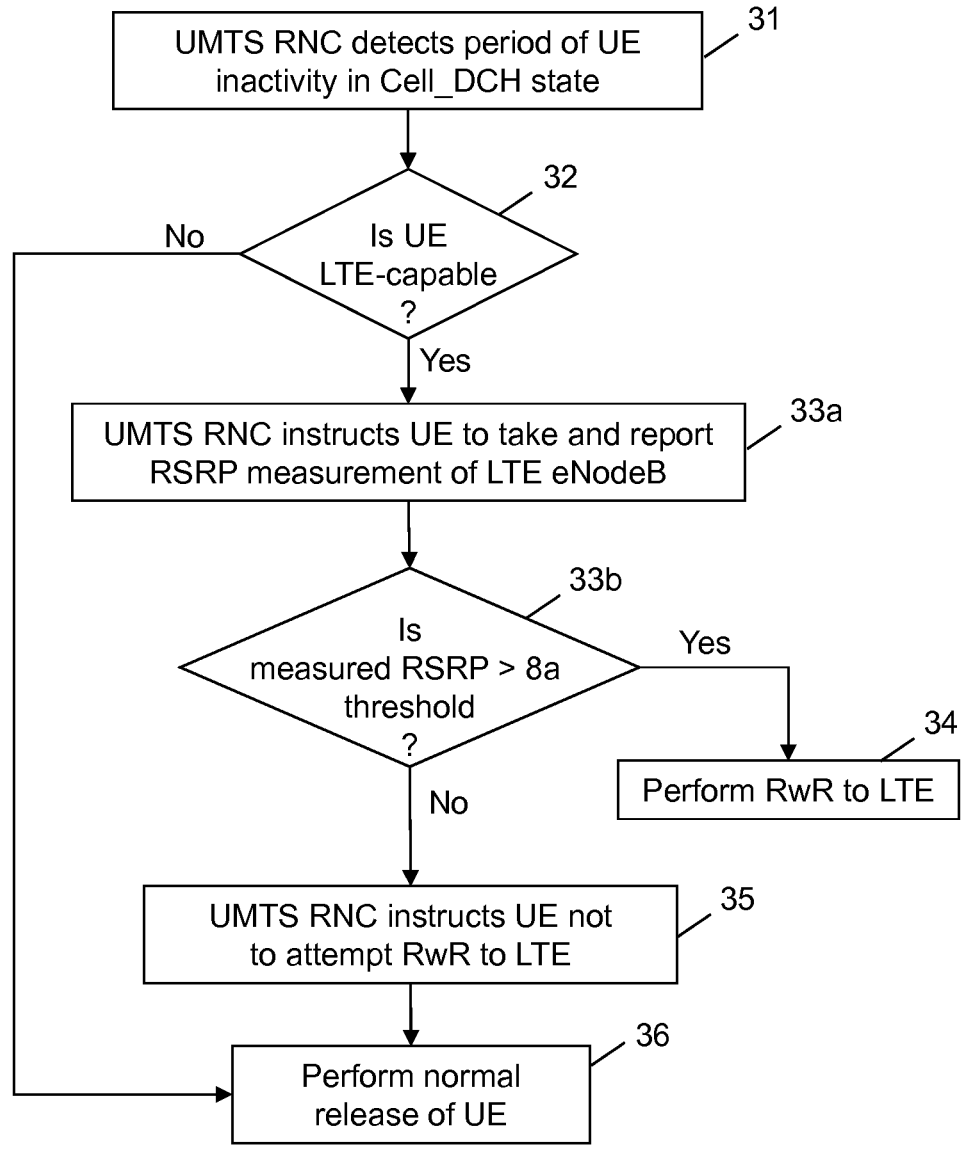
FIG. 3 is a flow chart schematically illustrating another exemplary embodiment of a method for controlling the RwR procedure according to the present disclosure.

FIG. 3 is a flow chart schematically illustrating another exemplary embodiment of a method for controlling the RwR procedure according to the present disclosure. This method is similar to the method of FIG. 2 and describes the specific embodiment in which the RNC determines whether the UE will have adequate signal quality to connect to the LTE network by using the measured RSRP from the UE. Steps 31, 32, and 34-36 are the same as in FIG. 2. Step 33 is divided into two sub-steps, 33*a* and 33*b*. At step 33*a*, the UMTS RNC 13 instructs the UE 11 to take and report an RSRP measurement of the LTE eNodeB 14. At step 33*b*, the RNC determines whether the measured RSRP exceeds a new event 8*a* redirection threshold. If so, the method moves to step 34 and performs the RwR procedure to redirect the UE to the LTE network. If the measured RSRP does not exceed the new event 8*a* redirection threshold, the method moves to step 35 where the RNC instructs the UE not to attempt RwR to the LTE network. The method then moves to step 36 where the RNC performs a normal release of the UE.

The embodiment of FIG. 3 requires implementation of a new event 8*a* redirection threshold parameter in WCDMA. The RNC must also direct the UE to measure LTE signal quality while the UE is on a UTRAN cell. The new event 8*a* redirection threshold (for example an RSRP/EcNo threshold) can then be used as a decision maker for RwR in order to avoid redirection when LTE radio conditions are currently poor. The new event 8*a* redirection threshold may be optimized based on the LTE coverage. In this way leakage can be controlled.

Figure 4:
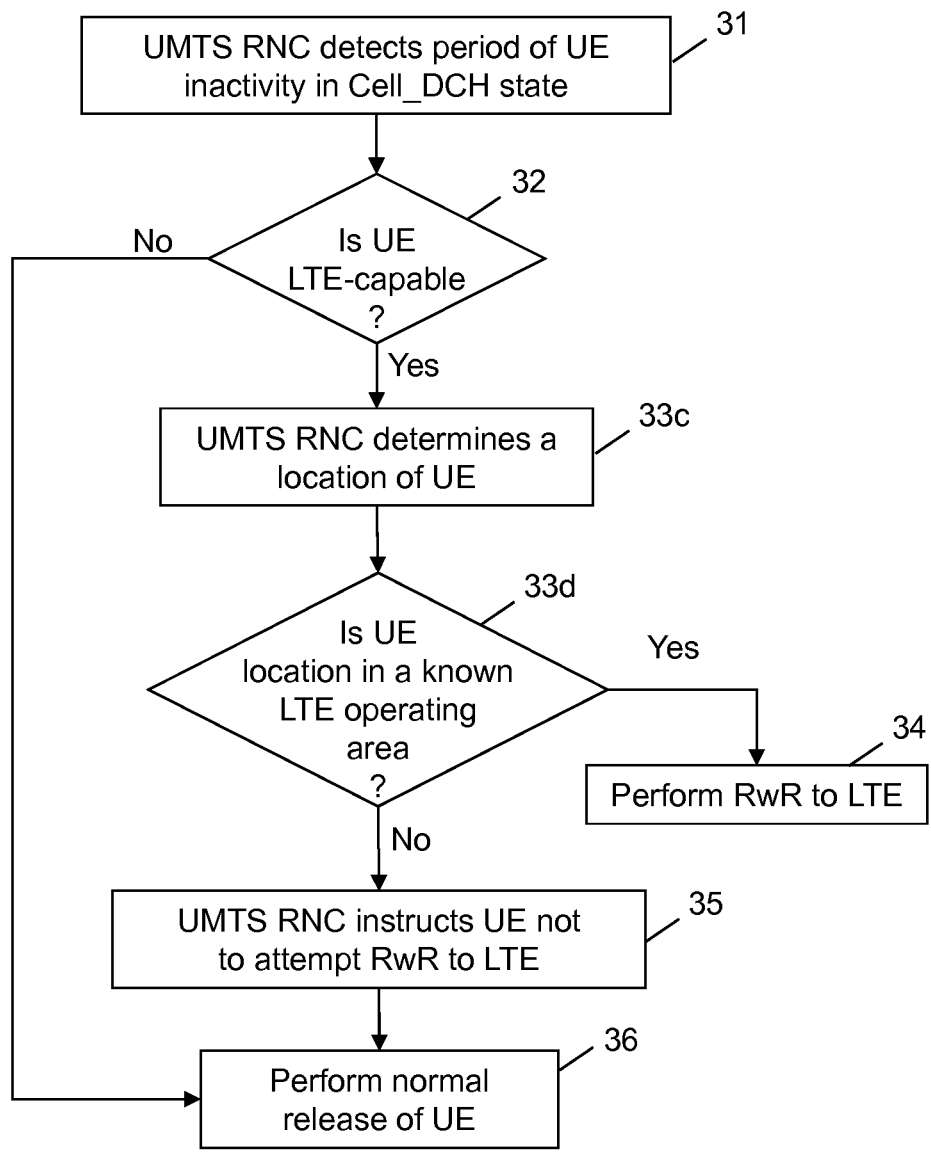
FIG. 4 is a flow chart schematically illustrating another exemplary embodiment of a method for controlling an RwR procedure according to the present disclosure.

FIG. 4 is a flow chart schematically illustrating another exemplary embodiment of a method for controlling an RwR procedure according to the present disclosure. This method is also similar to the method of FIG. 2 and describes the specific embodiment in which the RNC determines whether the UE will have adequate signal quality to connect to the LTE network by using the location of the UE. Steps 31, 32, and 34-36 are the same as in FIG. 2. Step 33 is divided into two sub-steps, 33*c* and 33*d*. At step 33*c*, the UMTS RNC 13 determines the location of the UE. This may be done by obtaining a GPS location or other location information from the UE or by performing another known positioning technique such as angle of arrival (AOA) or time of arrival (TOA) and the like. At step 33*d*, the RNC determines whether the UE location is in a known LTE operating area. This step requires either populating the RNC with LTE coverage information or programming the RNC to obtain this information from another source. If the RNC determines the UE location is in a known LTE operating area, the method moves to step 34 and performs the RwR procedure to redirect the UE to the LTE network. If the UE location is not in a known LTE operating area, the method moves to step 35 where the RNC instructs the UE not to attempt RwR to the LTE network. The method then moves to step 36 where the RNC performs a normal release of the UE.

Figure 5:
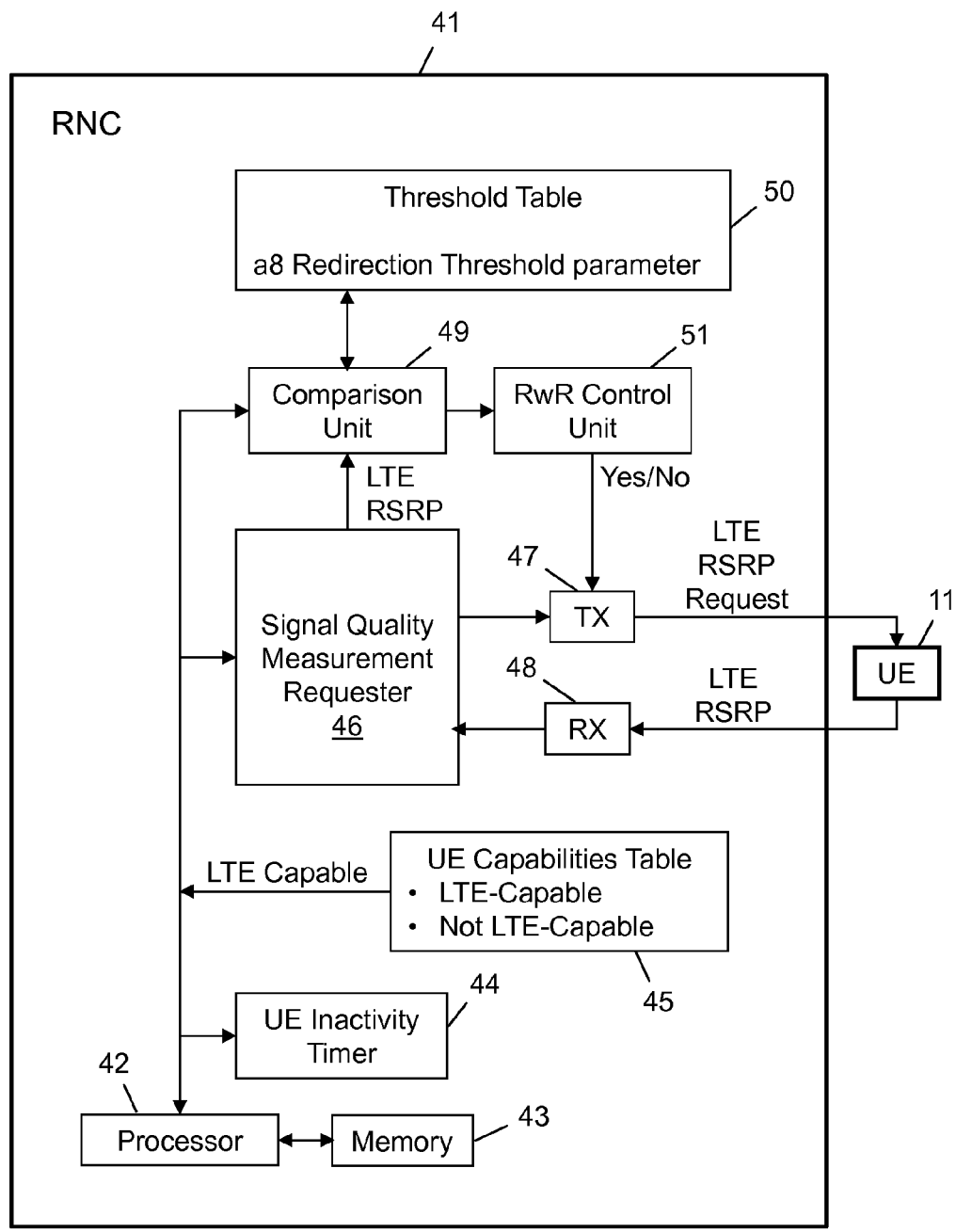
FIG. 5 is a block diagram schematically illustrating an exemplary embodiment of a Radio Network Controller (RNC) according to the present disclosure.

FIG. 5 is a block diagram schematically illustrating an exemplary embodiment of a Radio Network Controller (RNC) 41 according to the present disclosure. Operation of the RNC may be controlled, for example, by a processor 42 executing computer program instructions stored in a memory 43. A UE inactivity timer 44 determines when a LTE-capable UE 11, which is currently on a UTRAN cell in Cell_DCH state, has been inactive for a defined period of time. The RNC may determine that the UE is, or is not, LTE-capable by accessing a UE capabilities table 45 with an identifier of the UE. As a result of determining that the UE is LTE-capable, a signal quality measurement requester 46 causes a transmitter 47 to transmit a request to the UE to take and report an RSRP measurement of LTE eNodeBs within range. The UE takes the RSRP measurements and reports the results to the RNC through a receiver 48.

The LTE RSRP measurements are passed to a comparison unit 49, which compares the measurements with the 8a redirection threshold parameter, which may be stored in a threshold table 50, and determines whether the measured RSRP exceeds the new event 8a redirection threshold. The result of the comparison is passed to an RwR control unit 51. If the measured RSRP exceeds the new event 8a redirection threshold, the RwR control unit causes an RRC Connection Release message (with Redirect to E-UTRA) to be sent to the UE. If the measured RSRP does not exceed the new event 8a threshold, the RwR control unit causes an instruction to be sent to the UE not to attempt RwR to the LTE network. This embodiment guarantees the UE will have adequate LTE RSRP, but requires the UMTS RNC to be modified to request the UE to take and report an RSRP measurement of LTE eNodeBs within range.

Figure 6:
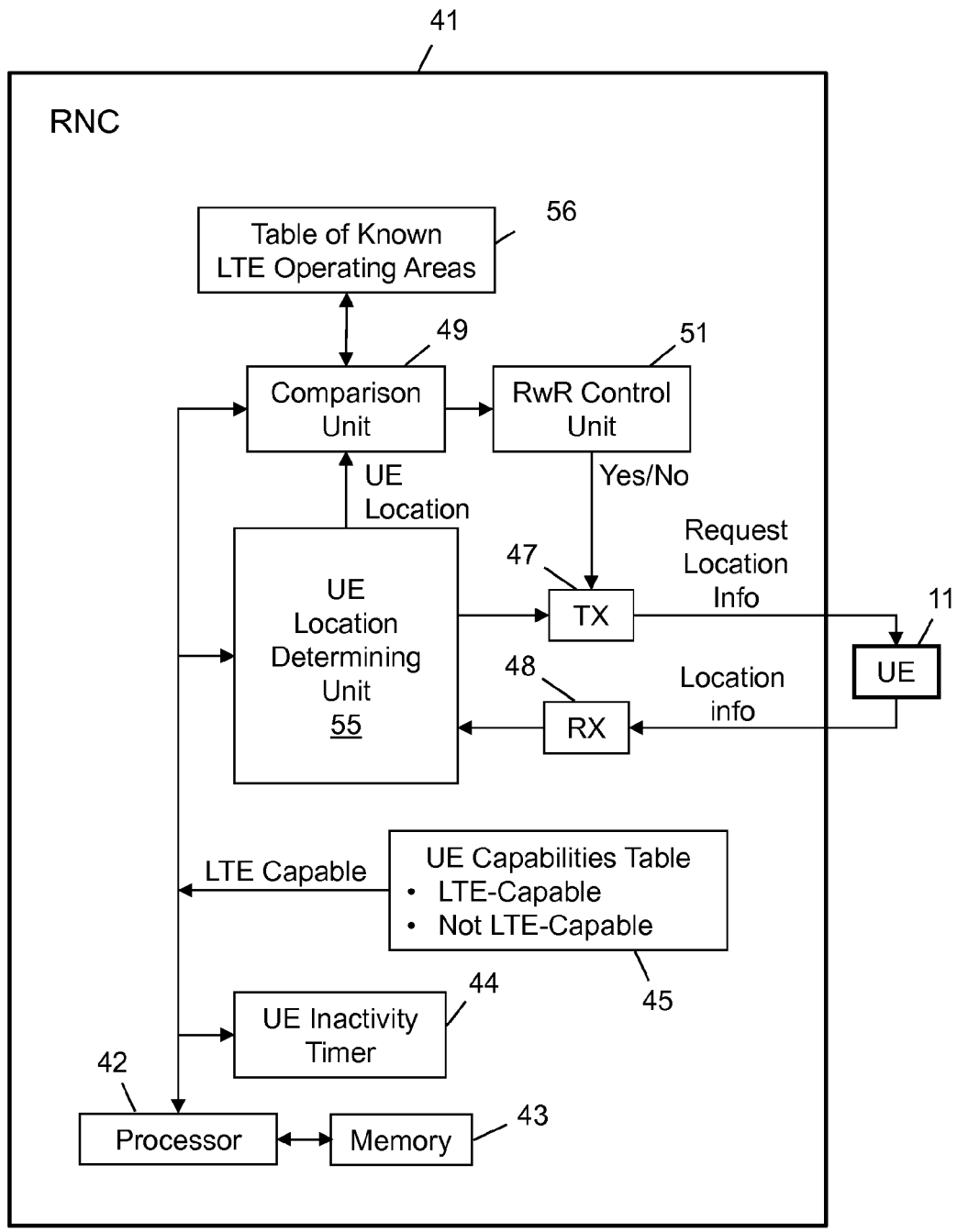
FIG. 6 is a block diagram schematically illustrating another exemplary embodiment of an RNC according to the present disclosure.

FIG. 6 is a block diagram schematically illustrating another exemplary embodiment of the RNC 41 according to the present disclosure. The components are similar to those of FIG. 5 except that the signal quality measurement requester 46 is replaced by a UE location determining unit 55, and the threshold table 50 is replaced with a table of known LTE operating areas 56. When the UE inactivity timer 44 expires and the RNC determines the UE is LTE-capable, the UE location determining unit may request location information from the UE, or may determine the location using another known positioning method. Alternatively, the RNC may obtain the location information from an external source such as a UE positioning center. Once the UE location information is known, the comparison unit 49 compares the location with known LTE operating areas to determine whether the UE is in a known LTE operating area and thus should have adequate signal quality to connect to the LTE network. This embodiment is faster than the embodiment utilizing the new event 8a redirection threshold, and uses less signaling, but it does not guarantee the UE will have adequate LTE RSRP.

The result of the comparison is passed to an RwR control unit 51. If the UE is in a known LTE operating area, the RwR control unit causes an RRC Connection Release message with Redirect to E-UTRA to be sent to the UE. If the UE is not in a known LTE operating area, the RwR control unit causes an instruction to be sent to the UE not to attempt RwR to the LTE network.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method in a Radio Network Controller (RNC) in a non-Long Term Evolution (non-LTE) radio access network for controlling a Release with Redirection (RwR) procedure in which a User Equipment (UE) operating in the non-LTE radio access network is released and redirected to an LTE radio access network, the method comprising:
   detecting by the RNC, that the UE has been inactive for a defined period of time;
   in response to detecting that the UE has been inactive for the defined period of time and when the UE is capable of operating in the LTE radio access network, determining by the RNC, whether the UE will have adequate signal quality to operate in the LTE radio access network; and
   performing by the RNC, the RwR procedure to release the UE from the non-LTE radio access network and redirect the UE to the LTE radio access network only upon determining that the UE will have adequate signal quality to operate in the LTE radio access network.

2. The method as recited in claim 1, wherein the step of determining whether the UE will have adequate signal quality to operate in the LTE radio access network includes:
   instructing by the RNC, the UE to perform a signal quality measurement of an LTE eNodeB and to send the signal quality measurement in a measurement report to the RNC; and
   determining by the RNC, whether the signal quality measurement of the LTE eNodeB exceeds a redirection threshold.

3. The method as recited in claim 2, further comprising, upon determining the signal quality measurement from the LTE eNodeB does not exceed the redirection threshold:
   instructing by the RNC, the UE not to attempt to access the LTE radio access network; and
   releasing the UE by the RNC.

4. The method as recited in claim 1, wherein the step of determining whether the UE will have adequate signal quality to operate in the LTE radio access network includes:
   determining by the RNC, a location of the UE; and
   determining by the RNC, that the UE will have adequate signal quality to operate in the LTE radio access network when the location of the UE is in a known LTE operating area.

5. The method as recited in claim 1, wherein the non-LTE radio access network is a Wideband Code Division Multiple Access (WCDMA) radio access network.

6. A Radio Network Controller (RNC) in a non-Long Term Evolution (non-LTE) radio access network for controlling a Release with Redirection (RwR) procedure in which a User Equipment (UE) operating in the non-LTE radio access network is released and redirected to an LTE radio access network, the RNC comprising:
   a processor coupled to a memory that stores computer program instructions, wherein when the processor executes the computer program instructions, the RNC is caused to:
   detect that the UE has been inactive for a defined period of time;
   in response to detecting that the UE has been inactive for the defined period of time and when the UE is capable of operating in the LTE radio access network, determine whether the UE will have adequate signal quality to operate in the LTE radio access network; and
   perform the RwR procedure to release the UE from the non-LTE radio access network and redirect the UE to the LTE radio access network only upon determining that the UE will have adequate signal quality to operate in the LTE radio access network.

7. The RNC as recited in claim 6, wherein the RNC is configured to determine whether the UE will have adequate signal quality to operate in the LTE radio access network by:
   instructing the UE to perform a signal quality measurement of an LTE eNodeB and to send the signal quality measurement in a measurement report to the RNC; and
   determining whether the signal quality measurement of the LTE eNodeB exceeds a redirection threshold.

8. The RNC as recited in claim 7, wherein upon determining the signal quality measurement from the LTE eNodeB does not exceed the redirection threshold, the RNC is configured to:

instruct the UE not to attempt to access the LTE radio access network; and release the UE.

9. The RNC as recited in claim 6, wherein the RNC is configured to determine whether the UE will have adequate signal quality to operate in the LTE radio access network by:

determining a location of the UE; and determining that the UE will have adequate signal quality to operate in the LTE radio access network when the location of the UE is in a known LTE operating area.

10. The RNC as recited in claim 6, wherein the non-LTE radio access network is a Wideband Code Division Multiple Access (WCDMA) radio access network.

11. A system in a non-Long Term Evolution (non-LTE) radio access network for controlling a Release with Redirection (RwR) procedure, the system comprising:

an LTE-capable User Equipment (UE) operating in the non-LTE radio access network; and an apparatus in a Radio Network Controller (RNC) configured to release and redirect the UE to an LTE radio access network when defined conditions are met, the apparatus comprising:

a timer for detecting that the UE has been inactive for a defined period of time;

a comparison unit configured to determine whether the UE will have adequate signal quality to operate in the LTE radio access network, in response to detecting by the timer that the UE has been inactive for the defined period of time; and an RwR control unit configured to perform the RwR procedure to release the UE from the non-LTE radio access network and redirect the UE to the LTE radio access network only upon determining by the comparison unit that the UE will have adequate signal quality to operate in the LTE radio access network.

12. The system as recited in claim 11, further comprising a signal quality measurement requester configured to request the UE to perform a signal quality measurement of an LTE eNodeB and to send the signal quality measurement in a measurement report to the RNC, in response to detecting by the timer that the UE has been inactive for the defined period of time; and wherein the comparison unit is configured to determine whether the UE will have adequate signal quality by determining whether the signal quality measurement of the LTE eNodeB exceeds a redirection threshold.

13. The system as recited in claim 12, wherein when the comparison unit determines the signal quality measurement from the LTE eNodeB does not exceed the redirection threshold, the RwR control unit is configured to:

instruct the UE not to attempt to access the LTE radio access network; and release the UE.

14. The system as recited in claim 11, further comprising a UE location determining unit configured to determine a location of the UE, in response to detecting by the timer that the UE has been inactive for the defined period of time; and wherein the comparison unit is configured to determine that the UE will have adequate signal quality to operate in the LTE radio access network when the location of the UE is in a known LTE operating area.

15. The system as recited in claim 11, wherein the non-LTE radio access network is a Wideband Code Division Multiple Access (WCDMA) radio access network.

* * * * *